(12) United States Patent
Nandy et al.

(10) Patent No.: US 10,594,558 B2
(45) Date of Patent: Mar. 17, 2020

(54) AUTO-CONFIGURING MULTICAST PROTOCOL PARAMETERS

(71) Applicant: Hewlett Packard Enterprise Development LP, Houston, TX (US)

(72) Inventors: Tathagata Nandy, Bangalore (IN); Balaji Sankaran, Bangalore (IN); Vijay Kannan, Bangalore (IN); Guru Gurram Janardhan, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/005,899

(22) Filed: Jun. 12, 2018

(65) Prior Publication Data
US 2019/0058635 A1 Feb. 21, 2019

(30) Foreign Application Priority Data
Aug. 19, 2017 (IN) .............................. 201741029424

(51) Int. Cl.
| | | |
|---|---|---|
| H04L 12/24 | (2006.01) | |
| H04L 12/18 | (2006.01) | |
| H04L 12/26 | (2006.01) | |
| H04L 12/753 | (2013.01) | |
| H04L 12/751 | (2013.01) | |

(52) U.S. Cl.
CPC ........ H04L 41/0886 (2013.01); H04L 12/185 (2013.01); H04L 43/0829 (2013.01); H04L 45/02 (2013.01); H04L 45/48 (2013.01); *H04L 12/1877* (2013.01)

(58) Field of Classification Search
None
See application file for complete search history.

(56) References Cited

U.S. PATENT DOCUMENTS

| | | | |
|---|---|---|---|
| 6,557,111 B1 * | 4/2003 | Theimer ............ | G06F 11/1482 714/4.4 |
| 7,565,416 B1 * | 7/2009 | Shafer ................ | H04L 41/0813 709/203 |
| 7,855,956 B2 | 12/2010 | Zhang | |

(Continued)

FOREIGN PATENT DOCUMENTS

| | | |
|---|---|---|
| CN | 105827451 A | 8/2016 |
| JP | 2005244847 A | 4/2005 |

OTHER PUBLICATIONS

Juniper Networks, Inc.,"Example: Configuring Automatic IP Multicast Without Explicit Tunnels," Apr. 12, 2015, , 13 pages.

(Continued)

*Primary Examiner* — Eunsook Choi
(74) *Attorney, Agent, or Firm* — Hewlett Packard Enterprise Patent Department

(57) ABSTRACT

Some examples relate to auto-configuration of a parameter related to a multicast protocol on a network device. In an example, a network device in a multicast network may identify the network topology of the multicast network. Upon identification, the network device may enable a multicast protocol on the network device based on the network topology of the multicast network. The network device may determine a network parameter related to the multicast network. In response to the determination, a multicast parameter related to the multicast protocol may be auto-configured on the network device.

18 Claims, 4 Drawing Sheets

(56) References Cited

U.S. PATENT DOCUMENTS

| | | | |
|---|---|---|---|
| 9,143,437 B1* | 9/2015 | Grosser | H04L 45/16 |
| 9,432,203 B2 | 8/2016 | Park | |
| 2003/0179703 A1 | 9/2003 | Levy et al. | |
| 2007/0104192 A1* | 5/2007 | Yoon | H04L 12/4641 |
| | | | 370/389 |
| 2010/0228837 A1 | 9/2010 | Squire et al. | |
| 2014/0003245 A1* | 1/2014 | Han | H04L 47/806 |
| | | | 370/236 |
| 2015/0195093 A1* | 7/2015 | Mahadevan | H04L 12/185 |
| | | | 370/390 |
| 2016/0006646 A1* | 1/2016 | Lin | H04L 12/6418 |
| | | | 370/390 |
| 2016/0080251 A1 | 3/2016 | Ramachandran et al. | |
| 2016/0323116 A1* | 11/2016 | Garofalo | H04L 12/1868 |
| 2018/0302315 A1* | 10/2018 | Kamisetty | H04L 12/462 |

OTHER PUBLICATIONS

Romdhani et al., "Security and Routing Scoped IP Multicast Addresses", International Conference on Parallel Processing Workshops, 2009, pp. 228-235.

* cited by examiner

AUTO-CONFIGURING MULTICAST PROTOCOL PARAMETERS

BACKGROUND

Multicast technology is being increasingly favored to provide rich content over a network. Multicast is a mechanism for transmitting data from a single source (for example, a server) to multiple receivers (for example, personal computers) on a network. Multicast packets are replicated down appropriate paths in a network to create an efficient routing mechanism. The sender may send a data packet once, even if the packet is to be delivered to multiple receivers.

BRIEF DESCRIPTION OF THE DRAWINGS

For a better understanding of the solution, examples will now be described, purely by way of example, with reference to the accompanying drawings, in which.

DETAILED DESCRIPTION

Figure 1:
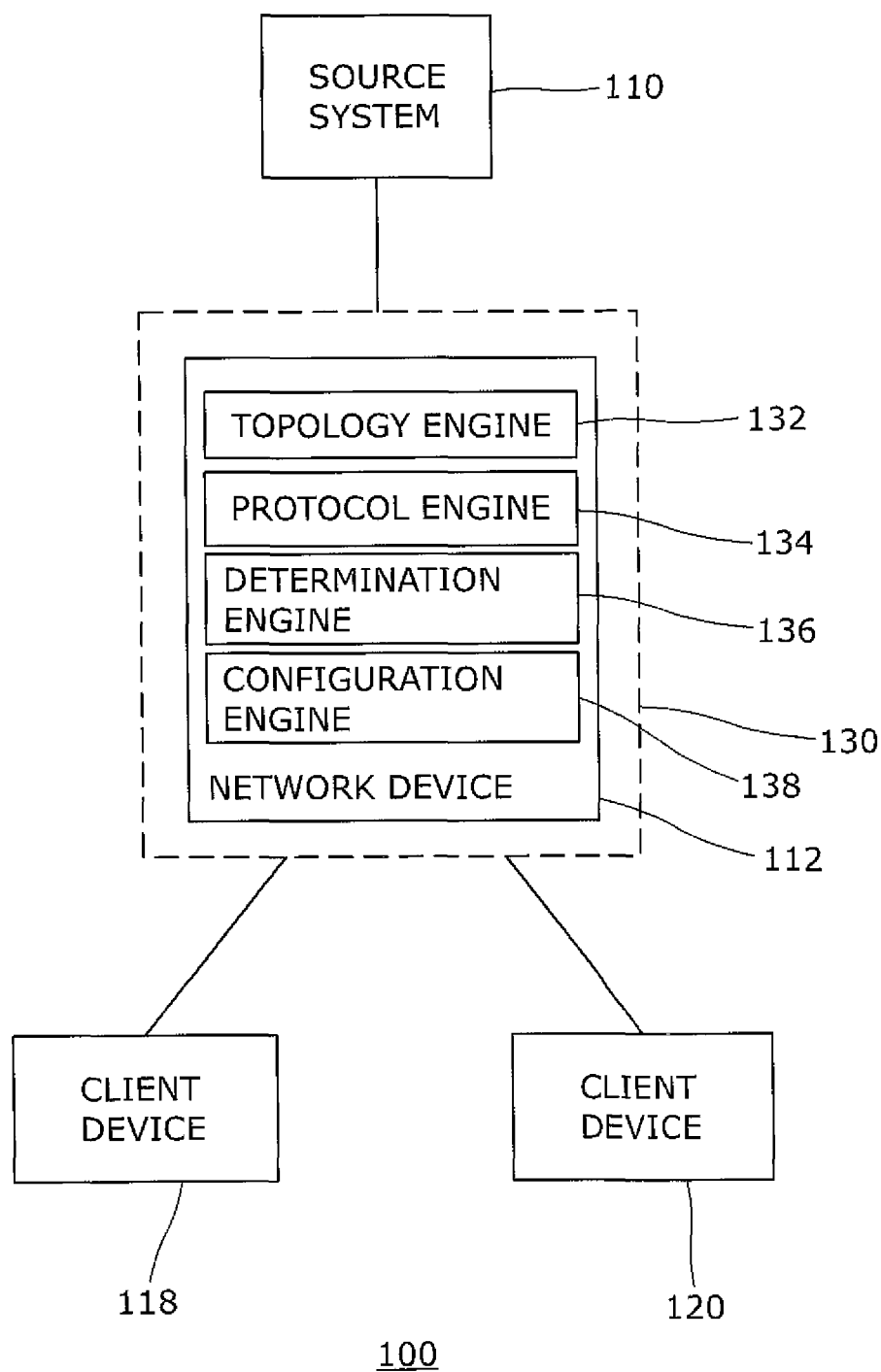
FIG. 1 is a block diagram of an example computing environment for auto-configuring a parameter related to a multicast protocol on a network device.

Multicast technology may be used by organizations to send data (especially, multimedia content) over a network. Multicast technology may allow host computer systems, who have subscribed to a particular content data flow of a content server, to receive the content. Host systems may signify their willingness to receive a particular data from a content server by joining a particular multicast group. Once host systems join a particular group, a multicast distribution tree may be created for that group. The flow of data from a multicast source system to receiver devices may be managed by a multicast protocol. Some non-limiting examples of protocols that may be used to manage flow of data in a multicast system may include Internet Group Management Protocol (IGMP), Multicast Ustener Discovery (MLD) protocol, Protocol Independent Multicast (PIM), and Distance Vector Multicast Routing Protocol (DVMRP).

The Internet Group Management Protocol (IGMP) is an Internet protocol that may be used by IPv4 systems (hosts and routers) to report their IP multicast group memberships to any neighboring multicast routers. The protocol may be used between end systems (hosts) and a multicast router to request data for a given multicast group.

Protocol Independent Multicast (PIM) is a family of multicast routing protocols for Internet Protocol (IP) networks that provide one-to-many and many-to-many distribution of data over a network. PIM is not dependent on a specific unicast routing protocol; it can make use of any unicast routing protocol in use on the network.

Multicast network deployments may involve configuration of various multicast protocols like IGMP, MLD, PIM, MSDP, etc. These protocols in turn have hundreds of configurable parameters that are to be configured for efficient multicast forwarding in a network. Managing these protocols and effectively configuring these parameters is a technically challenging task.

To address this technical challenge, the present disclosure describes various examples for auto-configuring a parameter related to a multicast protocol on a network device. In an example, a network device in a multicast network may identify the network topology of the multicast network. Upon identification, the network device may enable a multicast protocol on the network device based on the network topology of the multicast network. The network device may determine a network parameter related to the multicast network. In response to the determination, a multicast parameter related to the multicast protocol may be auto-configured on the network device.

The proposed solution proposes a zero touch configuration for multicast deployments where various network parameters may be determined by a network device (for example, a network switch), which may enable the network device to auto-configure a multicast protocol and the configuration parameters related thereto without user intervention. Further, the network parameters may be regularly monitored by the network device basis which the configuration parameters related to a multicast protocol may be dynamically updated on the network device.

FIG. 1 is a block diagram of an example computing environment 100 for auto-configuring a parameter related to a multicast protocol on a network device. In an example, computing environment 100 may represent a multicast network. In an example, computing environment 100 may include a source system 110, a network device 112, and client devices 118 and 120. Although one source system, one network device, and two client computing devices are shown in FIG. 1, other examples consistent with this disclosure may include more than one source system, more than one network device, and more or less than two client computing devices.

Source system 110, network device 112, and client computing devices 118 and 120, may be communicatively coupled, for example, via a computer network 130. Such a computer network 130 may be a wireless or wired network. Such a computer network 130 may include, for example, a Local Area Network (LAN), a Wireless Local Area Network (WAN), a Metropolitan Area Network (MAN), a Storage Area Network (SAN), a Campus Area Network (CAN), or the like. Further, such a computer network 130 may be a public network (for example, the Internet) or a private network (for example, an intranet). In an example, computer network 130 may be an IPv4 or IPv6 network. In an example, computer network 130 may be used to transmit and route multicast content.

Source system 110 may be any type of computing device capable of reading machine-executable instructions. Examples of the computing device may include, without limitation, a server, a desktop computer, a notebook computer, a tablet computer, a thin client, a mobile device, a personal digital assistant (PDA), a phablet, and the like. In an example, source system 110 may host multicast content. Multicast content may include, for example, data, image, audio, video, multimedia, and other like content. Multicast content may be shared with client devices 118 and 120 (also known as multicast subscribers) through network device 112.

Network device 112 may include, for example, a router, a virtual router, a network switch, and a virtual switch. In an example, network device 112 may be a multicast router.

Network device 112 may be used to route multicast data from source system 110 to a client computing device(s) (for example, 118 and 120).

Client computing devices 118 and 120 may each be any type of computing device that is capable of executing machine-readable instructions. Examples of the computing device may include, without limitation, a server, a desktop computer, a notebook computer, a tablet computer, a thin client, a mobile device, a personal digital assistant (PDA), a phablet, and the like. Client computing devices 118 and 120 may each include a client or multicast application for receiving multicast data from a source system (for example, 110).

Multicast technology may allow client computing devices (for example, 118 and 120), who may have subscribed to a particular content data flow of a source system (for example, 110), to receive content from the source system. Client devices (for example, 118 and 120) may signify their willingness to receive a particular data from a content server by joining a particular multicast group. Once client devices join a particular group, a multicast distribution tree may be created for that group. The flow of data from a multicast source system to receiver devices over network 130 may be managed by a multicast protocol. Examples of multicast protocol may include IGMP and PIM.

IGMP may be used between client computing devices (for example, 118 and 120) and a multicast router (for example, 112) to request data for a given multicast group. Routers may use IGMP group membership to build their multicast routing table.

In an example, network device 112 may include a topology engine 132, a protocol engine 134, a determination engine 136, and a configuration engine 138.

Engines 132, 134, 136, and 138 may each include any combination of hardware and programming to implement the functionalities of the engines described herein. In examples described herein, such combinations of hardware and software may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of network device 112. In some examples, the at least one machine-readable storage medium may store instructions that, when executed by the at least one processing resource, at least partially implement some or all engines of network device 112. In such examples, network device 112 may include the at least one machine-readable storage medium storing the instructions and the at least one processing resource to execute the instructions.

In an example, topology engine 132 on network device 112, which may be present in a multicast network (for example, 100), may identify a network topology of the multicast network. In an example, topology engine 132 may identify whether the network topology of the multicast network is a layer 2 network topology and/or a layer 3 network topology.

Subsequent to the identification of the network topology by topology engine 132, protocol engine 134 on network device 112 may enable a multicast protocol on network device based on the network topology. For example, in response to an identification that the network topology of the multicast network simply includes a layer 2 topology, protocol engine 134 may simply enable Internet Group Management Protocol (IGMP) snooping on network device 112. IGMP snooping is the mechanism for listening to IGMP network traffic. The mechanism allows network device 112 to listen in on the IGMP conversation between hosts and routers. In another example, in response to an identification that the network topology of the multicast network includes both a layer 2 topology and a layer 3 topology, protocol engine 134 may enable PIM protocol, in addition to IGMP protocol, on network device 112. In a yet another example, in response to an identification that the network topology of the multicast network includes a layer 3 topology, protocol engine 134 may enable both IGMP and PIM protocols on network device 112.

Determination engine 136 on network device 112 may determine a network parameter related to the multicast network. Examples of the network parameter may include a number of multicast sources (for example, 110) in the multicast network, a number of multicast receivers (for example, 118 and 120) in the multicast network, a number of queriers in the multicast network, network traffic in the multicast network, a number of interior gateway protocols (IGPs) configured in the multicast network, packet loss in the multicast network, latency between a querier and a multicast receiver in the multicast network, and presence of a multi-access LAN in the multicast network.

Configuration engine 138 may auto-configure on network device 112, a multicast parameter related to the multicast protocol based on the network parameter related to the multicast network. For example, in response to a determination that the multicast network includes more multicast sources compared to multicast receivers, configuration engine 138 may enable a PIM sparse mode of the PIM protocol on network device 112. In sparse mode, a router assumes that no other routers want to get multicast traffic. In this case, the router closest to the host receives a multicast PIM join message from the receiver device.

In another example, in response to a determination that the multicast network includes less multicast sources compared to multicast receivers, configuration engine 138 may enable a PIM dense mode of the PIM protocol on network device 112. PIM dense mode uses dense multicast routing. It implicitly builds shortest-path trees by flooding multicast traffic domain wide, and then pruning back branches of the tree where no receivers are present. In dense mode, a router assumes that all other routers want to receive multicast data for a specific group. If a router receives these packets, and realizes that there may not be any clients for these packets that the router is aware of, the router sends a prune message back to the originating router.

In a further example, determination engine 136 may determine a number of interior gateway protocols (IGPs) configured in the multicast network by determination engine 136. In response, configuration engine 138 may auto-configure assert timer on network device 112, based on the number of interior gateway protocols (IGPs) configured in the multicast network. PIM assert messages may be used to determine a forwarder on a network with multiple routers. The forwarder is the router that forwards multicast packets to a network. When an assert message is received, the assert timer may be set to an assert timeout period. The assert timeout period is restarted every time a subsequent assert message for the route entry is received.

In another example, determination engine 136 may determine that there are no multi-access LAN in the multicast network. In response, configuration engine 138 may disable LAN prune delay option on network device 112. This may allow upstream routers to prune the traffic with starting prune pending timers.

In a still further example, determination engine 136 may determine amount of traffic in the multicast network. In response, configuration engine 138 may auto-configure PIM sparse mode or PIM dense mode on network device 112, based on the amount of traffic in the multicast network. For example, if multicast receivers are present on each LAN, then PIM dense mode may be enabled. In case the number of multicast receivers is less than a pre-defined number, PIM sparse mode may be enabled.

In an example, determination engine 136 may determine a parameter related to network device 112. Examples of the parameter related to network device 112 may include a packet processing capability of network device 112, CPU load on network switch, a relative distance of network device 112 from a multicast source as compared to other network devices in the multicast network, and a number of PIM enabled interfaces on network device 112. In response to the determination by determination engine 136, configuration engine 138 may auto-configure a multicast parameter related to the multicast protocol on network device 112, based on the network parameter related to the multicast network and the parameter related to the network device 112. For example, determination engine 136 may determine CPU load and number of PIM enabled interfaces on network device 112. In response, configuration engine 138 may configure the hello interval on network device 112. The hello interval specifies the frequency at which hello messages are sent. The hello messages are used to advertise the existence of network device 112. In an example, the protocol parameter may be used for selecting the rendezvous point (RP) router in the multicast network.

In another example, determination engine 136 may determine a number of multicast receivers in the multicast network. In response, configuration engine 138 may auto-configure IGMP query-interval on network device 112 based on the number of multicast receivers in the multicast network. In an example deployment of IGMP protocol, a router may periodically broadcast IGMP query messages to determine which multicast addresses are of interest to host systems attached to its network. This router may be called IGMP querier (or querier). Host systems may respond to the query messages by sending IGMP report messages indicating their group memberships. The frequency at which the IGMP querier sends IGMP host-query messages from an interface may be referred to as IGMP "query-interval".

In a yet another example, determination engine 136 may determine that the Spanning Tree Protocol (STP), Rapid Spanning Tree Protocol (RSTP), and Multiple Spanning Tree Protocol (MSTP) are configured in the multicast network. In response, configuration engine 138 may enable fast-learn feature on network device 112. The fast-learn feature may enable IGMP protocol to quickly converge on topology change.

In a yet another example, determination engine 136 may determine packet loss in the multicast network. In response, configuration engine 138 may auto-configure robustness count on network device 112 based on the packet loss in the multicast network. Robustness count refers to the number of queries network device 112 sends before removing a multicast group from the multicast forwarding table.

In a further example, determination engine 136 may determine latency between a querier and a multicast receiver in the multicast network. In response, configuration engine 138 may auto-configure last member query interval based on the latency between the querier and the multicast receiver in the multicast network. The "last member query interval" may refer to the interval at which the router sends IGMP group-specific or group-source-specific query messages.

In an example, subsequent to the enablement of a multicast protocol on network device 112 by protocol engine 134, configuration engine 138 may auto-configure on network device 112, a multicast parameter related to the multicast protocol based on the enabled network topology. For example, in response to an identification that the network topology of the multicast network is a layer 2 topology, configuration engine 138 may enable IGMP snooping on network device 112. In another example, in response to an identification that the network topology of the multicast network is a layer 3 topology, configuration engine 138 may enable querier functionality on network device 112. In a yet another example, in response to an identification that the network topology of the multicast network is a layer 3 topology, configuration engine 138 may disable IGMP snooping on network device 112. Disabling IGMP snooping may help in conserving router and ASIC resources.

Figure 2:
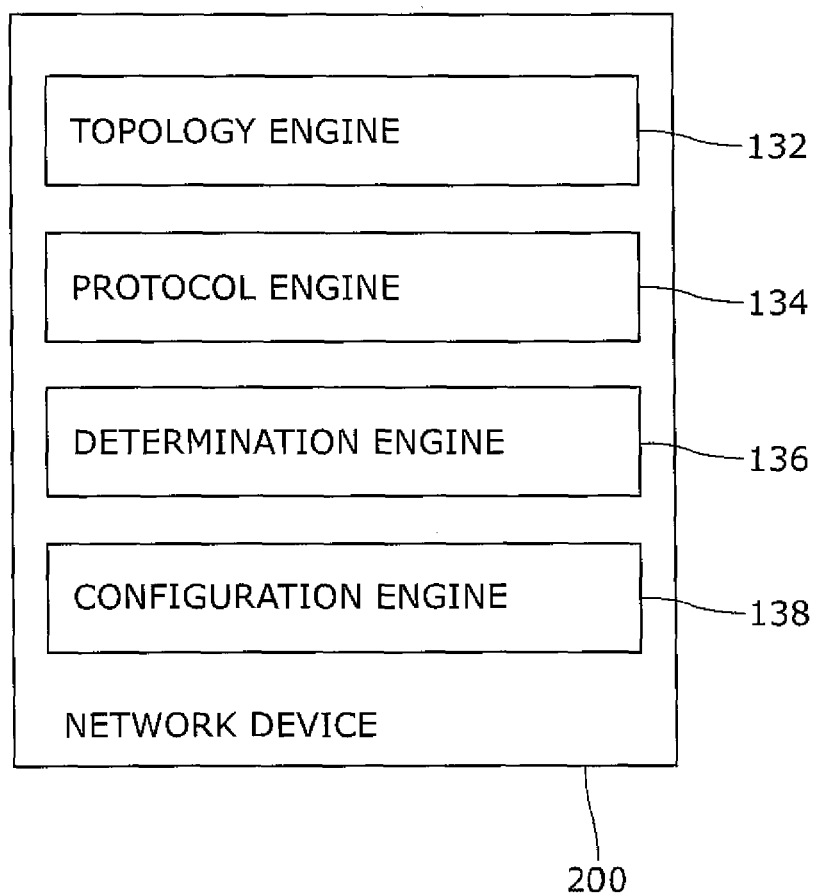
FIG. 2 is a block diagram of an example network device for auto-configuring a parameter related to a multicast protocol.

FIG. 2 is a block diagram of an example network device 200 for auto-configuring a parameter related to a multicast protocol on a network device. In an example, network device 200 may be analogous to network device 112 FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. The components or reference numerals may be considered alike.

Network device 200 may be, for example, a router, a virtual router, a network switch, and a virtual switch. In an example, network device 200 may be a multicast router. Network device 200 may be used to route multicast data from a source system to client computing device (i.e. multicast receivers). In an example, network device 200 may include a topology engine 132, a protocol engine 134, a determination engine 136, and a configuration engine 138.

In an example, topology engine 132 may identify a network topology of a multicast network (for example, 100). Subsequent to the identification, protocol engine 134 may enable a multicast protocol on the network device based on the network topology of the multicast network. Determination engine 136 may determine a network parameter related to the multicast network. Configuration engine 138 may auto-configure a multicast parameter related to the multicast protocol, based on the network parameter related to the multicast network. In an example, subsequent to the auto-configuration, determination engine 136 may determine that the network parameter related to the multicast network has changed. In response to the determination that the network parameter related to the multicast network has changed, configuration engine 138 may update the multicast parameter related to the multicast protocol on the network device.

Figure 3:
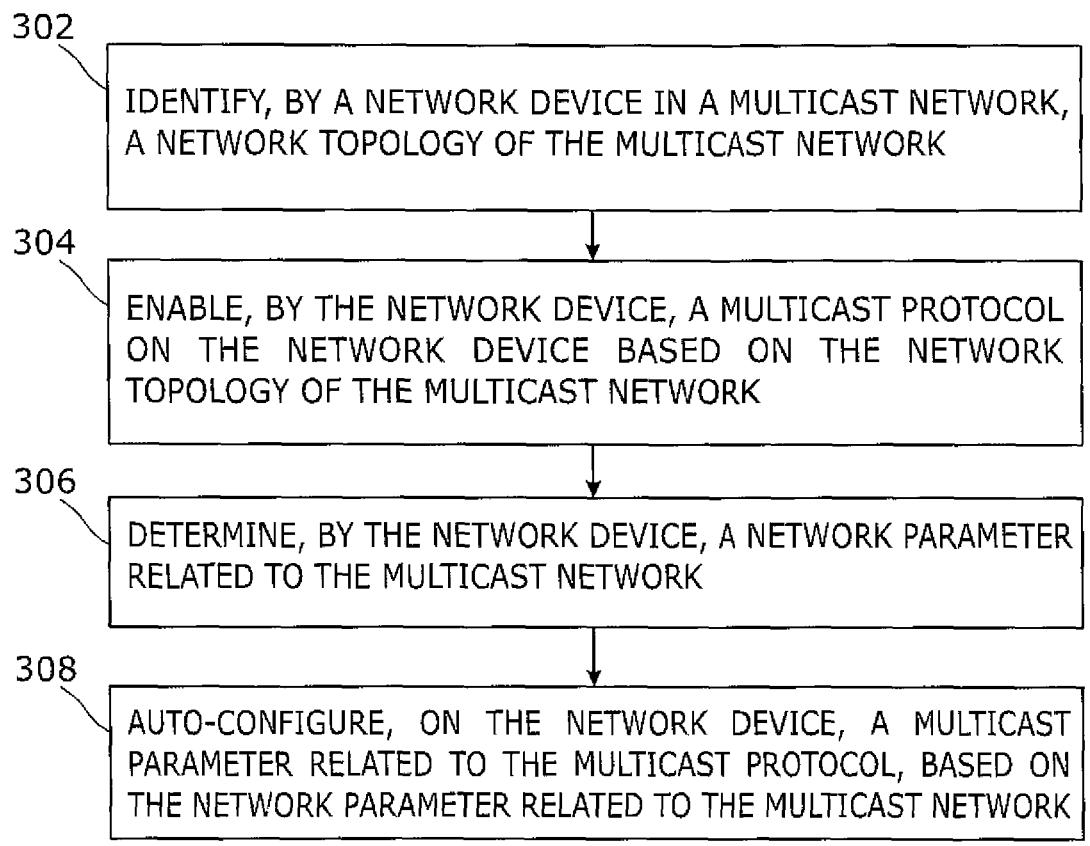
FIG. 3 is a flowchart of an example method of auto-configuring a parameter related to a multicast protocol on a network device.

FIG. 3 is a flowchart of an example method 300 of auto-configuring a parameter related to a multicast protocol on a network device. The method 300, which is described below, may at least partially be executed on a network device, for example, network device 112 of FIG. 1 or network device 200 of FIG. 2. However, other computing devices may be used as well. At block 302, a network device in a multicast network may identify the network topology of the multicast network. At block 304, upon identification, the network device may enable a multicast protocol on the network device based on the network topology of the multicast network. At block 306, the network device may determine a network parameter related to the multicast network. At block 308, in response to the determination, a multicast parameter related to the multicast protocol may be auto-configured on the network device.

Figure 4:
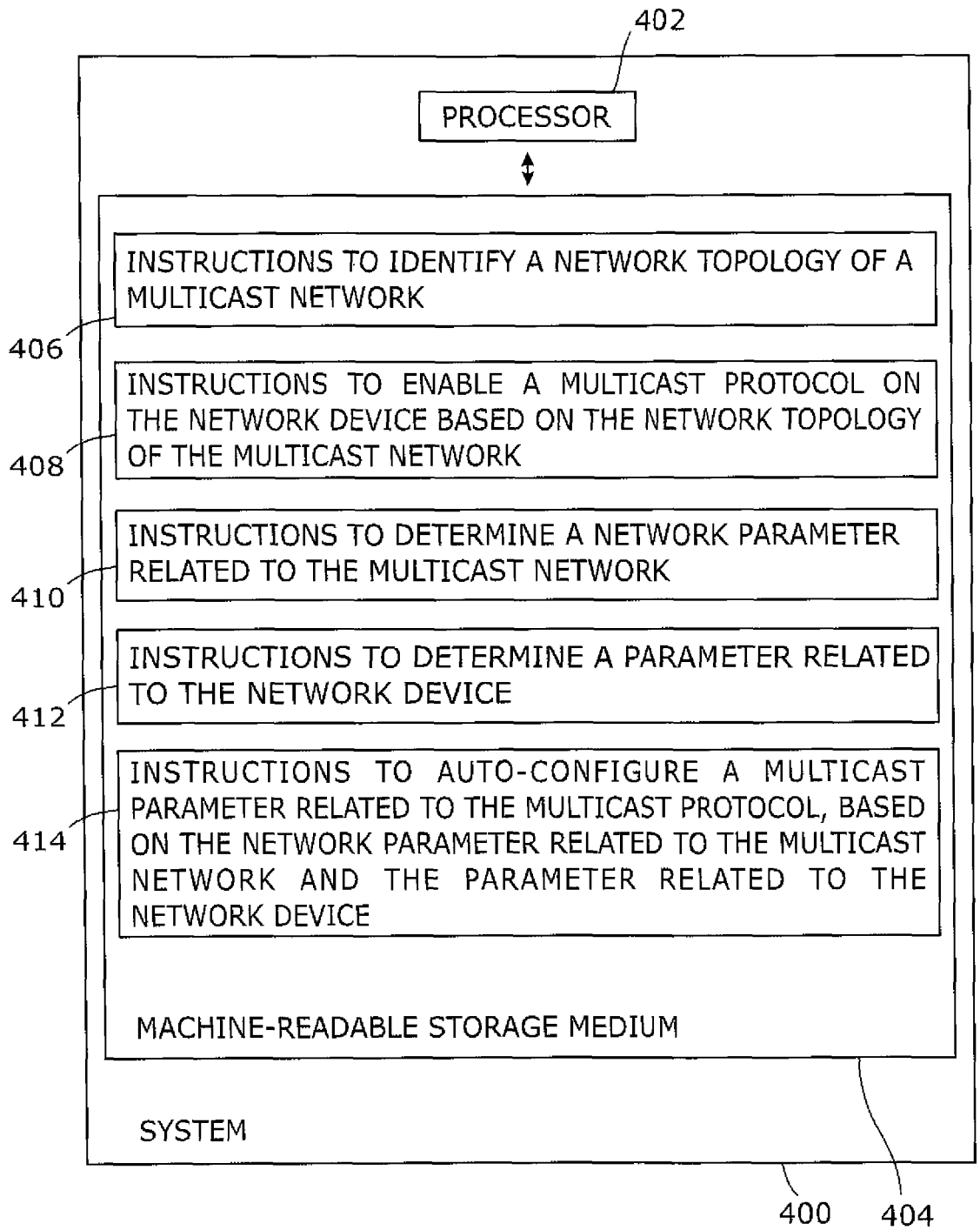
FIG. 4 is a block diagram of an example system including instructions in a machine-readable storage medium for auto-configuring a parameter related to a multicast protocol on a network device.

FIG. 4 is a block diagram of an example system 400 for auto-configuring a parameter related to a multicast protocol on a network device. System 400 includes a processor 402 and a machine-readable storage medium 404 communicatively coupled through a system bus. In an example, system 400 may be analogous to network device 112 of FIG. 1 or network device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or a storage memory media such as a floppy disk, a hard disk, a CD-ROM, a DVD, a pen drive, and the like. In an example, machine-readable storage medium 404 may be a non-transitory machine-readable medium. Machine-readable storage medium 404 may store instructions 406, 408, 410, 412, and 414. In an example, instructions 406 may be executed by processor 402 to identify a network topology of a multicast network. Instructions 408 may be executed by processor 402 to enable a multicast protocol on the network device based on the network topology of the multicast network. Instructions 410 may be executed by processor 402 to determine a network parameter related to the multicast network. Instructions 412 may be executed by processor 402 to determine a parameter related to the network device. Instructions 414 may be executed by processor 402 to auto-configure a multicast parameter related to the multicast protocol, based on the network parameter related to the multicast network and a parameter related to the network device.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

We claim:
1. A method comprising:
    identifying, by a network device in a multicast network, a network topology of the multicast network;
    enabling, by the network device, a multicast protocol on the network device based on the network topology of the multicast network;
    determining, by the network device, a network parameter related to the multicast network, including determining an amount of traffic in the multicast network; and
    auto-configuring, on the network device, a multicast parameter related to the multicast protocol, based on the network parameter related to the multicast network, including auto-configuring one of Protocol Independent Multicast (PIM) sparse mode and PIM dense mode on the network device based on the amount of traffic in the multicast network.
2. The method of claim 1, further comprising:
    determining, by the network device, that the network parameter related to the multicast network has changed; and
    updating, on the network device, the multicast parameter related to the multicast protocol, in response to the determination.
3. The method of claim 1, wherein enabling includes enabling a specific mode of the multicast protocol on the network device.
4. The method of claim 1, wherein identifying includes identifying whether the network topology is one of a layer 2 network topology or a layer 3 network topology.
5. The method of claim 4, wherein in response to the identification that the network topology of the multicast network is a layer 3 topology, enabling both Internet Group Management Protocol (IGMP) protocol and PIM protocol on the network device.
6. The method of claim 4, wherein in response to the identification that the network topology of the multicast network is a layer 2 topology, enabling IGMP snooping on the network device.
7. The method of claim 1, wherein:
    determining the network parameter includes determining a number of multicast receivers in the multicast network; and
    auto-configuring the multicast parameter related to the multicast protocol includes auto-configuring query interval on the network device based on the number of multicast receivers in the multicast network.
8. The method of claim 1, wherein:
    determining the network parameter includes determining packet loss in the multicast network; and
    multicast auto-configuring the multicast parameter related to the multicast protocol includes auto-configuring robustness count on the network device based on the packet loss in the multicast network.

9. A network device comprising:
a processing resource;
a non-transitory storage medium comprising instructions, the instructions executable by the processing resource to:
identify a network topology of a multicast network;
enable a multicast protocol on the network device based on the network topology of the multicast network;
determine a network parameter related to the multicast network and an amount of traffic in the multicast network;
auto-configure a multicast parameter related to the multicast protocol, based on the network parameter related to the multicast network;
auto-configuring one of Protocol Independent Multicast (PIM) sparse mode and PIM dense mode on the network device based on the amount of traffic in the multicast network; and
in response to a determination by the determination engine that the network parameter related to the multicast network has changed subsequent to the auto-configuration, update the multicast parameter related to the multicast protocol on the network device.

10. The network device of claim 9, wherein the non-transitory storage medium comprises instructions executable by the processing resource to consider the multicast protocol enabled on the network device prior to auto-configuration of the multicast parameter related to the multicast protocol.

11. The network device of claim 9, wherein the multicast protocol includes Internet Group Management Protocol (IGMP).

12. The network device of claim 9, wherein the multicast protocol includes PIM.

13. The network device of claim 9, wherein the network parameter includes at least one of a number of multicast sources in the multicast network, a number of multicast receivers in the multicast network, a number of queriers in the multicast network, network traffic, a number of interior gateway protocols (IGPs) configured in the multicast network, packet loss in the multicast network, latency between a querier and a multicast receiver in the multicast network, and presence of a multi-access LAN in the multicast network.

14. A non-transitory machine-readable storage medium comprising instructions, the instructions executable by a processor to:

identify a network topology of a multicast network;
enable a multicast protocol on the network device based on the network topology of the multicast network;
determine that the multicast network includes more multicast sources compared to multicast receivers;
determine a network parameter related to the multicast network;
determine a parameter related to the network device;
auto-configure a multicast parameter related to the multicast protocol, based on the network parameter related to the multicast network and the parameter related to the network device and
enable a Protocol Independent Multicast (PIM) sparse mode of PIM protocol on the network device, in response to the determination in response to the determination that the multicast network includes more multicast sources compared to multicast receivers.

15. The storage medium of claim 14, wherein:
the instructions to determine comprise instructions to determine that the multicast network includes less multicast sources compared to multicast receivers; and
the instructions to auto-configure comprise instructions to enable a PIM dense mode of PIM protocol on the network device, in response to the determination.

16. The storage medium of claim 14, wherein:
the instructions to determine comprise instructions to determine a number of interior gateway protocols (IGPs) configured in the multicast network; and
the instructions to auto-configure comprise instructions to auto-configure assert timer on the network device based on the number of interior gateway protocols (IGPs) configured in the multicast network.

17. The storage medium of claim 14, wherein:
the instructions to determine comprise instructions to determine latency between a querier and a multicast receiver in the multicast network; and
the instructions to auto-configure comprise instructions to auto-configure last member query interval based on the latency between the querier and the multicast receiver in the multicast network.

18. The storage medium of claim 14, wherein:
the instructions to identify comprise instructions to identify that the network topology of the multicast network includes both a layer 2 topology and a layer 3 topology; and
the instructions to enable comprise instructions to enable both Internet Group Management Protocol (IGMP) protocol and PIM protocol on the network device.

* * * * *